(12) United States Patent
Perreault et al.

(10) Patent No.: US 11,022,806 B2
(45) Date of Patent: Jun. 1, 2021

(54) AUGMENTED REALITY LIGHT FIELD HEAD-MOUNTED DISPLAYS

(71) Applicant: Google LLC, Mountain View, CA (US)

(72) Inventors: John D. Perreault, San Jose, CA (US); Patrick Llull, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/866,225

(22) Filed: May 4, 2020

(65) Prior Publication Data

US 2020/0264438 A1    Aug. 20, 2020

Related U.S. Application Data

(62) Division of application No. 15/905,192, filed on Feb. 26, 2018, now Pat. No. 10,678,056.

(51) Int. Cl.
*G02B 27/01* (2006.01)
*F21V 8/00* (2006.01)
(Continued)

(52) U.S. Cl.
CPC ....... *G02B 27/0172* (2013.01); *G02B 3/0056* (2013.01); *G02B 5/3058* (2013.01); *G02B 5/3083* (2013.01); *G02B 6/0038* (2013.01); *G02B 27/0983* (2013.01); *G02B 27/14* (2013.01); *H04N 13/307* (2018.05); *H04N 13/334* (2018.05); *H04N 13/344* (2018.05);
(Continued)

(58) Field of Classification Search
CPC .... G02B 2027/0134; G02B 2027/0136; G02B 2027/0174; G02B 2027/0178; G02B 27/0172; G02B 27/0983; G02B 27/14; G02B 3/0056; G02B 5/3058; G02B 5/3083; G02B 6/0038; H04N 13/307; H04N 13/334; H04N 13/344

See application file for complete search history.

(56) References Cited

U.S. PATENT DOCUMENTS 8,098,265 B2 * 1/2012 El-Ghoroury ........ H02N 9/3182
                                                                                 345/691
9,129,183 B2 * 9/2015 Venkataraman .......... G06T 9/00
(Continued)

FOREIGN PATENT DOCUMENTS

JP    2006215256 A    8/2006
JP    2012242513 A    12/2012
(Continued)

OTHER PUBLICATIONS

Marc, Levoy, and Hanrahan Pat. "Light field rendering." Proc. SIGGRAPH. 1996. (Year: 1996).*

(Continued)

*Primary Examiner* — Dmitriy Bolotin (57) ABSTRACT

A near-eye display system includes a transmissive display panel to display a near-eye light field frame comprising an array of elemental images. The transmissive display panel is configured to transmit light rays of the near-eye light field frame away from the user's eye and towards an array of curved beam splitters. The curved beam splitters collimate the transmitted light rays and reflect the collimated light rays back towards the transmissive display panel for passing to the user's eye.

20 Claims, 7 Drawing Sheets

(51) Int. Cl.
*G02B 5/30* (2006.01)
*G02B 27/14* (2006.01)
*H04N 13/334* (2018.01)
*G02B 3/00* (2006.01)
*H04N 13/307* (2018.01)
*H04N 13/344* (2018.01)
*G02B 27/09* (2006.01)

(52) U.S. Cl.
CPC ............... *G02B 2027/0134* (2013.01); *G02B 2027/0136* (2013.01); *G02B 2027/0174* (2013.01); *G02B 2027/0178* (2013.01)

(56) References Cited

U.S. PATENT DOCUMENTS

| | | | | |
|---|---|---|---|---|
| 10,297,071 B2* | 5/2019 | Alpaslan | ............... | G02B 30/10 |
| 10,678,056 B2* | 6/2020 | Perreault | ............... | G02B 27/14 |
| 2004/0184145 A1* | 9/2004 | Fridman | ............... | G02B 30/27 |
| | | | | 359/462 |
| 2010/0149073 A1* | 6/2010 | Chaum | ............... | G02B 27/0172 |
| | | | | 345/8 |
| 2013/0285885 A1* | 10/2013 | Nowatzyk | ............ | G02B 27/0172 |
| | | | | 345/8 |
| 2013/0314793 A1* | 11/2013 | Robbins | ............. | G02B 27/0172 |
| | | | | 359/573 |
| 2014/0168034 A1* | 6/2014 | Luebke | ............... | H04N 13/339 |
| | | | | 345/8 |
| 2014/0340389 A1* | 11/2014 | Lanman | ............. | G02B 27/0172 |
| | | | | 345/419 |
| 2015/0192827 A1 | 7/2015 | Shestak et al. | | |
| 2017/0214907 A1* | 7/2017 | Lapstun | ................. | G09G 3/003 |
| 2017/0323482 A1 | 11/2017 | Coup et al. | | |
| 2018/0084245 A1* | 3/2018 | Lapstun | ................. | G02B 30/24 |
| 2018/0316935 A1* | 11/2018 | Boisson | ............... | H04N 19/577 |
| 2018/0352209 A1* | 12/2018 | Liu | ...................... | H04N 13/271 |
| 2019/0265477 A1* | 8/2019 | Perreault | ............. | H04N 13/307 |

FOREIGN PATENT DOCUMENTS

| | | |
|---|---|---|
| WO | 2014129630 A | 8/2014 |
| WO | 2015134738 A1 | 9/2015 |

OTHER PUBLICATIONS

Qin, Zong, et al. "Resolution-enhanced light field displays by recombining subpixels across elemental images." Optics letters 44.10 (2019): 2438-2441. (Year: 2019).*
Hung, Fu-Chung. "The light field stereoscope: immersive computer graphics via factored near-eye light field displays with focus cues" vol. 34. (2015). (Year: 2015).*
Wu, Gaochang, et al. "Light field image processing: An overview." IEEE Journal of Selected Topics in Signal Processing 11.7 (2017): 926-954. (Year: 2017).*
Office Action dated Nov. 24, 2020 for European Patent Application No. 19705032.1-1020, 4 pages.
International Preliminary Report on Patentability dated Sep. 3, 2020 for International Application No. PCT/US2019/015613, 10 pages.
Office Action dated Nov. 24, 2020 for Japanese Patent Application No. 2020-544847, 7 pages.

* cited by examiner

AUGMENTED REALITY LIGHT FIELD HEAD-MOUNTED DISPLAYS

CROSS-REFERENCE TO RELATED APPLICATIONS

The presentation application is a divisional application of U.S. patent application Ser. No. 15/905,192, entitled "Augmented Reality Light Field Head-Mounted Displays," and filed on Feb. 26, 2018, the entirety of which is incorporated by reference herein.

BACKGROUND

Head-mounted displays (HMDs) and other near-eye display systems can utilize a lightfield display or other computational display to provide effective display of three-dimensional (3D) graphics. Generally, the lightfield display employs one or more display panels and an array of lenslets, pinholes, or other optic features that overlie the one or more display panels. A rendering system renders an array of elemental images, with each elemental image representing an image or view of an object or scene from a corresponding perspective or virtual camera position. In the case of HMDs, virtual objects can be superimposed on the visual the user views (e.g., a real world scene) to provide an augmented reality (AR) or mixed reality (MR) immersive experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate example systems for transparent light field AR displays in a near-eye display system. In at least one embodiment, the near-eye display system employs a computational display to display integral lightfield frames of imagery to a user so as to provide the user with an AR or MR experience. Each integral lightfield frame is composed of an array of elemental images, with each elemental image representing a view of an object or scene from a different corresponding viewpoint.

As the eyebox dimensions, or "size", for computational displays are proportional to the ratio of eye relief to focal length of optical elements, an attempt to increase eyebox size generally results in reduced field of view (FOV), and vice versa. To provide for an AR display with improved eyebox size without a corresponding reduction in FOV, in at least one embodiment the near-eye display systems described herein utilize transparent backlights, transparent display panels, and tiled optics to enable beam-splitting and near-eye reconstruction of a light field image on the retina. As an example, the near-eye display system may include a transmissive display panel to display a near-eye light field frame comprising an array of elemental images. The transmissive display panel is configured to transmit light rays of the near-eye light field frame away from the user's eye and towards an array of curved beam splitters. The curved beam splitters collimate the transmitted light rays and reflect the collimated light rays back towards the transmissive display panel (i.e., transparent) for passing to the user's eye. Thus, the use of transparent optical elements enables an increase in the path length traveled by light rays, and thus the FOV and eyebox size, without increasing the form factor of the near-eye display system.

Figure 1:
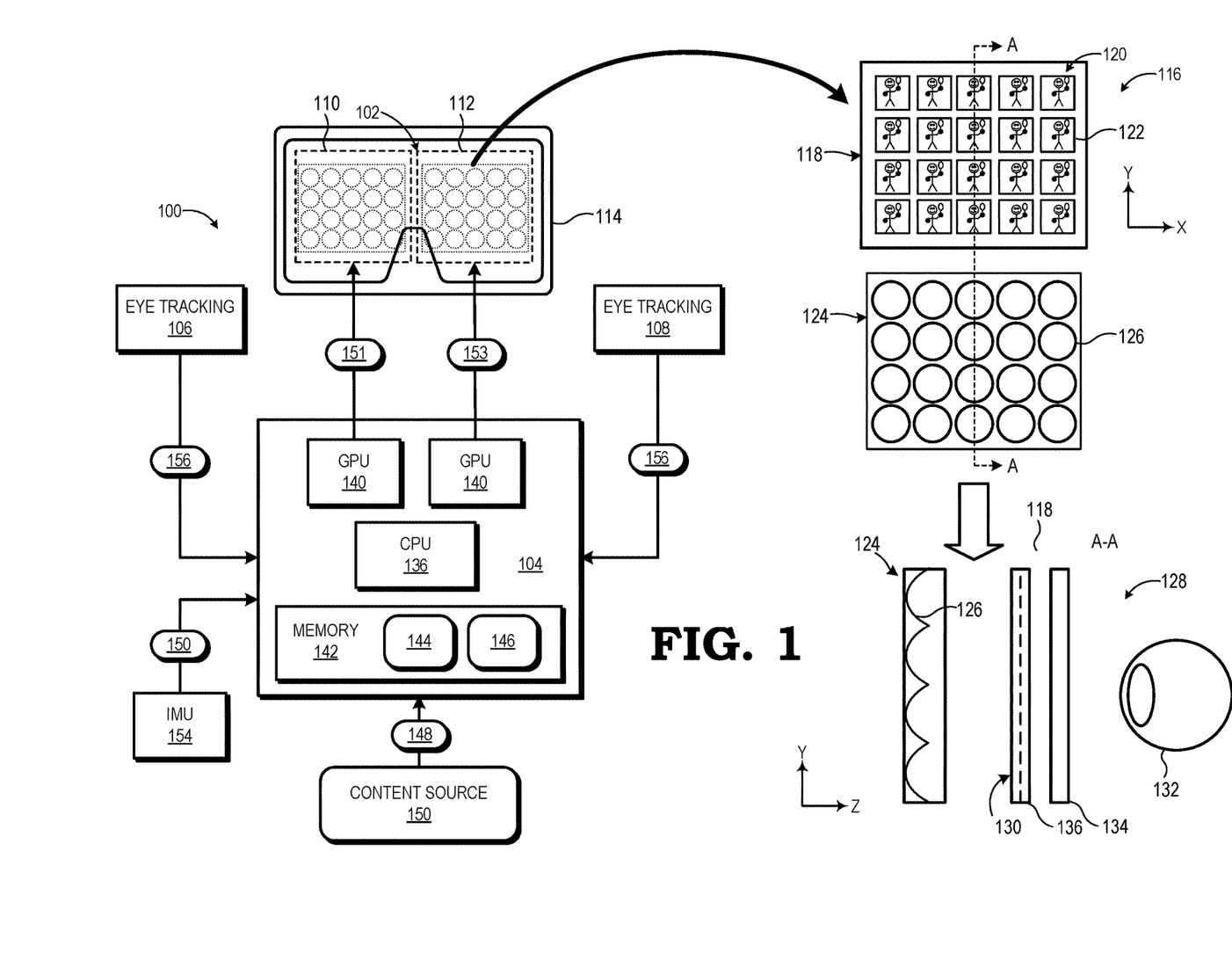
FIG. 1 is a diagram illustrating a near-eye display system incorporating backlit light field displays in accordance with some embodiments.

FIG. 1 illustrates a near-eye display system 100 incorporating backlit light field displays in accordance with some embodiments. In the depicted example, the near-eye display system 100 includes a computational display sub-system 102, a rendering component 104, and one or more eye tracking components, such as one or both of an eye tracking component 106 for tracking a user's left eye and an eye tracking component 108 for tracking the user's right eye. The computational display sub-system 102 includes a left-eye display 110 and a right-eye display 112 mounted in an apparatus 114 (e.g., goggles, glasses, other head-mounted display (HMD), etc.) that places the displays 110, 112 in front of the left and right eyes, respectively, of the user.

As shown by view 116, each of the displays 110, 112 includes at least one display panel 118 to display a sequence or succession of integral light field frames (hereinafter, "light field frame" for ease of reference), each of which comprises an array 120 of elemental images 122. For ease of reference, an array 120 of elemental images 122 may also be referred to herein as a light field frame. Each of the displays 110, 112 further includes an array 124 of beam splitters 126 overlying the display panel 118. In some embodiments, the number of beam splitters 126 in the beam splitter array 124 is equal to the number of elemental images 122 in the array 120, but in other implementations the number of beam splitters 126 may be fewer or greater than the number of elemental images 122. Note that while the example of FIG. 1 illustrates a 5×4 array of elemental images 122 and a corresponding 5×4 array 124 of beam splitters 126 for ease of illustration, in a typical implementation the number of elemental images 122 in a light field frame and the number of beam splitters 126 in the beam splitter array 124 typically is much higher. Further, in some embodiments, a separate display panel 118 is implemented for each of the displays 110, 112, whereas in other embodiments the left-eye display 110 and the right-eye display 112 share a single display panel 118, with the left half of the display panel 118 used for the left-eye display 110 and the right half of the display panel 118 used for the right-eye display 112.

Cross-view 128 of FIG. 1 depicts a cross-section view along line A-A of the beam splitter array 124 overlying the display panel 118 such that the beam splitter array 124 overlies the display surface 130 of the display panel 118 such that the display panel 118 is disposed between the beam splitter array 124 and the corresponding eye 132 of the user. As discussed in further detail herein, the display panel 118 includes a transparent backlight 134 and a transmissive display panel 136. In this configuration, light is emitted from the display panel 118 (e.g., from the transparent backlight 134 and through the transmissive display panel 136) towards the beam splitter array 124, and each beam splitter 126 redirects (e.g., reflects) a corresponding region of the display surface 130 onto the pupil 134 of the eye, with each such region at least partially overlapping with one or more adjacent regions.

In such computational display configurations, when an array 120 of elemental images 122 is displayed at the display surface 130 of the display panel 118 and then redirected by the beam splitters 126 of the beam splitter array 124 towards the eye 132, the user perceives the array 120 of elemental images 122 as a single virtual image. When this process is performed in parallel for both the left eye and right eye of the user with the proper parallax implemented therebetween, the result is the presentation of autostereoscopic three-dimensional (3D) virtual imagery to the user. Additionally, light from the real world (e.g., a real world environment in which the user is situated) is passed through the beam splitter array 124, the transmissive display panel 136, and then the transparent backlight 134 towards the eye 132. Thus, virtual imagery is superimposed over, or otherwise combined with, real world imagery to present augmented-reality (AR) and/or mixed-reality (MR) imagery to the user.

As also shown in FIG. 1, the rendering component 104 includes a set of one or more processors, such as the illustrated central processing unit (CPU) 138 and graphics processing units (GPUs) 140 and one or more storage components, such as system memory 142, to store software programs or other executable instructions that are accessed and executed by the processors 138, 140 so as to manipulate the one or more of the processors 138, 140 to perform various tasks as described herein. Such software programs include, for example, rendering program 144 comprising executable instructions for a rendering process, as described below, as well as an eye tracking program 146 comprising executable instructions for an eye tracking process, as also described below.

In operation, the rendering component 104 receives rendering information 148 from a local or remote content source 150, where the rendering information 148 represents graphics data, video data, or other data representative of an object or scene that is the subject of imagery to be rendered and displayed at the display sub-system 102. Executing the rendering program 144, the CPU 138 uses the rendering information 148 to send drawing instructions to the GPUs 140, which in turn utilize the drawing instructions to render, in parallel, a series of lightfield frames 151 for display at the left-eye display 110 and a series of lightfield frames 153 for display at the right-eye display 112 using any of a variety of well-known VR/AR/MR computational light field rendering processes. As part of this rendering process, the CPU 138 may receive pose information 150 from an inertial management unit (IMU) 154, whereby the pose information 150 is representative of a current pose of the display sub-system 102 and control the rendering of one or more pairs of light field frames 151, 153 to reflect the viewpoint of the object(s) or scene(s) from the current pose.

Figure 2:
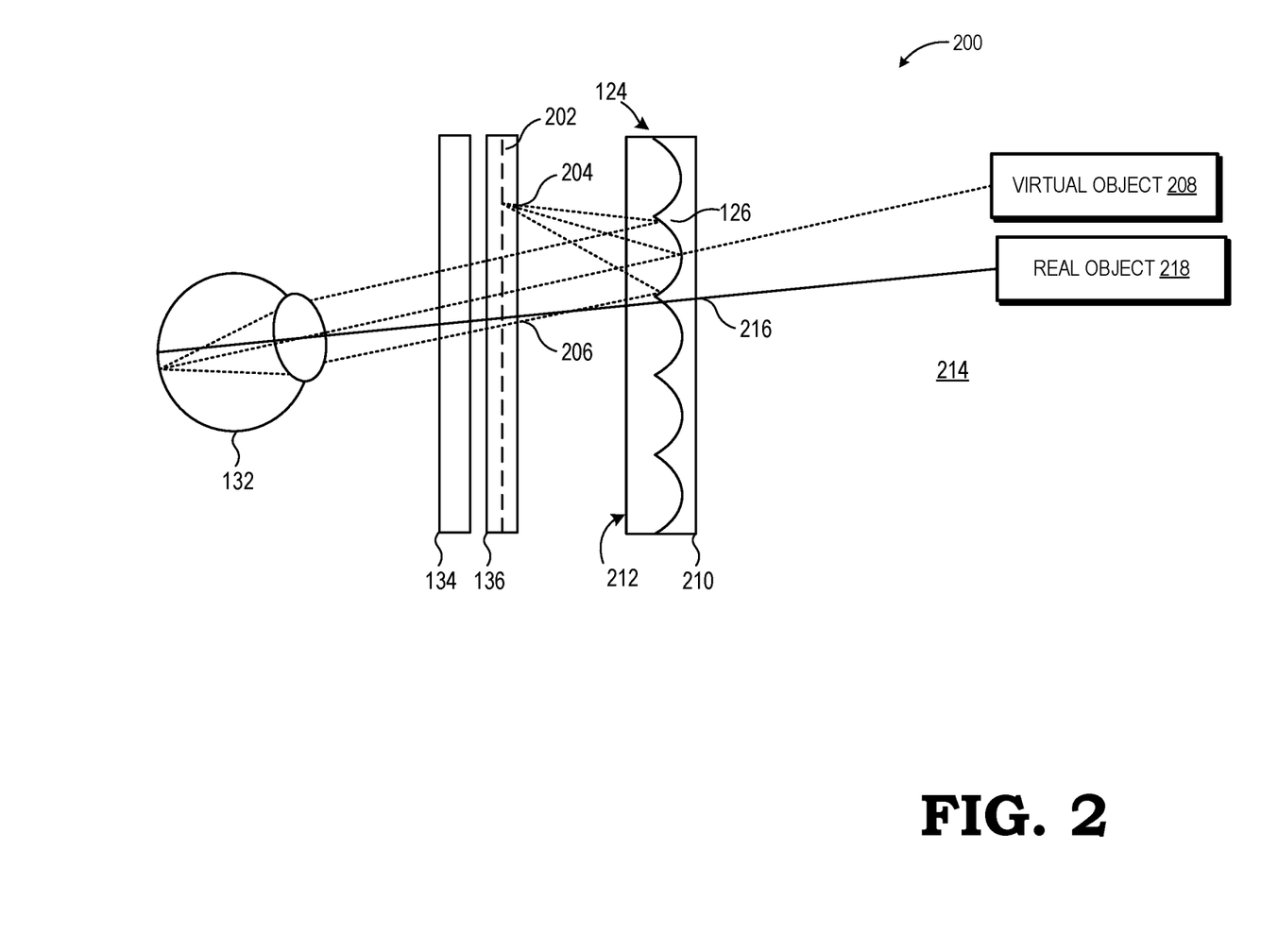
FIG. 2 is a diagram illustrating an example backlit light field display of the near-eye display system of FIG. 1 in accordance with some embodiments.

To further illustrate, FIG. 2 depicts a cross-section view 200 of an example backlit light field display such as the ones utilized in the near-eye display system 100 in accordance with some embodiments. As shown in this view, light emitted from the transparent backlight 134 passes through the transmissive display panel 136. In various embodiments, the transmissive display panel 136 is a transparent spatial light modulator (SLM) that receives incoming light from the transparent backlight 134. As discussed further herein, the modulation of light as it transmits through the SLM results in light emitted from the transparent backlight 134 to be replicated and/or diffracted, thereby becoming visible as a rainbow diffraction effect (e.g., such as caused by multiple higher diffraction orders).

In some embodiments, such as illustrated in FIG. 2, the transmissive display panel 136 includes an embedded grating 202 (or stacked with the transmissive display panel 136 rather than being embedded within) that operates to compensate for the effects of this diffraction. Because the SLM itself modulates the phase and/or the intensity of an incident light beam (i.e., the SLM itself acts as one grating), a pairing of the transmissive display panel 136 with the grating 202 can be modeled as a stacked pair of gratings (either amplitude or phase-gratings dependent upon the modulation performed by the SLM). Accordingly, by orienting the grating 202 such that it is shifted relative to the SLM and has the same pitch as the SLM, the higher diffraction orders cancel out, thereby eliminating or reducing the amount of rainbow diffraction effects.

In various embodiments, the curved beam splitter 126 is coated with an amplitude, spectral (i.e., wavelength-based), or polarization beam-splitter coating such as to be reflective. The light rays 204 passing through the transmissive display panel 136 are reflected by the curved beam splitter 126. The reflected light rays 206, which are collimated by the curved beam splitter 126, pass back through the transmissive display panel 136 and the transparent backlight 134 to be perceived by the eye 132 of the user. As shown, the reflected light rays 206 correspond to a virtual object 208. Although described in FIG. 2 in the context of curved beam splitters 126, those skilled in the art will recognize that optical elements capable of performing the above described collimation operation on the incoming light rays 204 from the transmissive display panel 136 may be utilized without departed from the scope of the present disclosure.

In some embodiments, rather than utilizing an array 124 of curved beam splitters 126 with physically curved surfaces having a beam splitter coating (and embedded in some substrate 210) as illustrated in FIG. 2, the beam splitter includes patterning diffractive reflectors on the substrate 210. Non-embedded optical elements also have the benefit of being easier, relative to substrate-embedded structures, to construct. For example, various holographic, thick/thin diffractive, Fresnel zone structures, or metamaterial nanophotonic array elements could be patterned (not shown) on the display panel facing surface 212 of the substrate 210. Similar to the curved beam splitters 126, such optical elements operate on amplitude, spectral (i.e., wavelength-based), or polarization beam-splitter behavior. In general, according to various embodiments, the beam splitter includes any optical element capable of collimating incoming light beams whether it be by reflection, refraction, or diffraction.

Light from the real world, such as a real world environment 214 in which the user is situated and towards which the eye gaze is directed, passes through the beam splitter array 124, the transmissive display panel 136, and then the transparent backlight 134 towards the eye 132. For example, light rays 216 associated with the real object 218 pass through the beam splitter array 124, the transmissive display panel 136, and then the transparent backlight 134 towards the eye 132. When the light rays 204 are redirected by the beam splitters 126 of the beam splitter array 124 towards the eye 132, the user also perceives virtual images. Thus, virtual imagery is superimposed over, or otherwise combined with, real world imagery to present augmented-reality (AR) and/or mixed-reality (MR) imagery to the user.

Figure 3A:
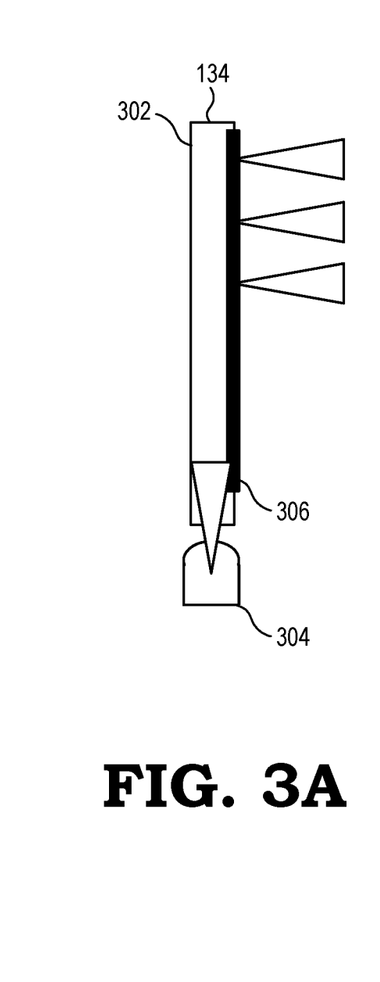
FIGS. 3A-3D illustrate cross-section views of example transparent backlights in the near-eye display system of FIG. 1 in accordance with some embodiments.
Figure 3B:
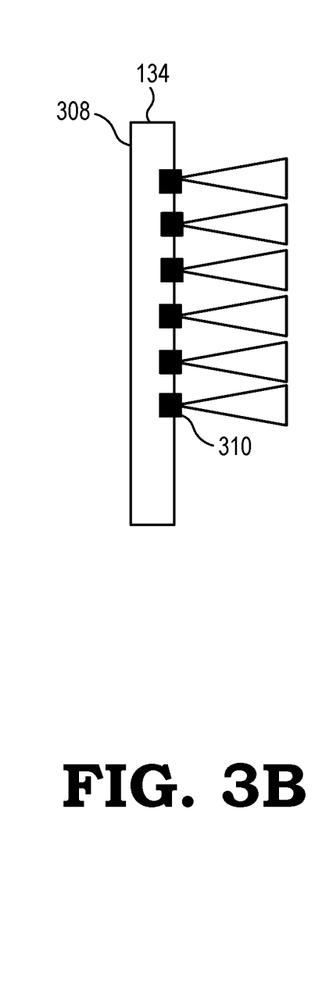
Figure 3C:
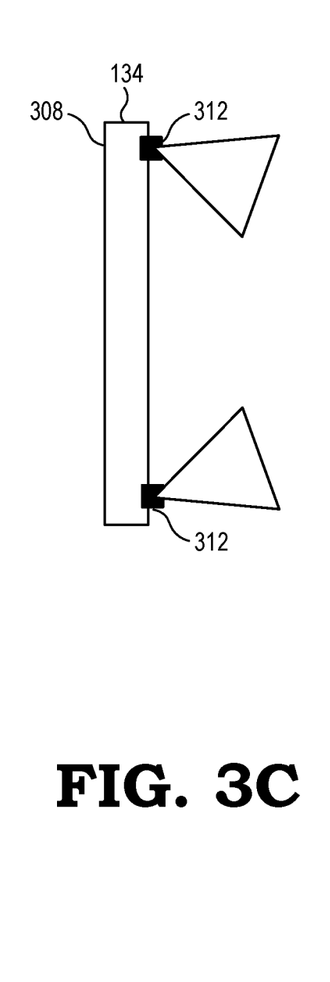
Figure 3D:
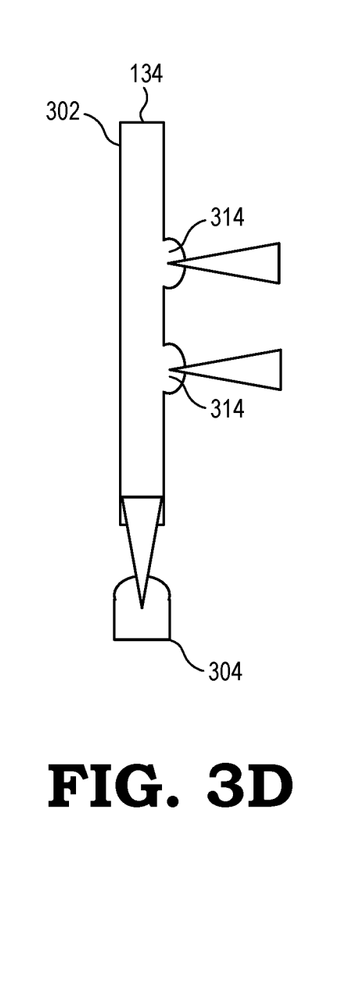

FIGS. 3A-3D illustrate cross-section views of example transparent backlights in the near-eye display system of FIG. 1 accordance with some embodiments. The transparent backlight 134 of FIG. 3A includes a planar waveguide 302 within which light from a light source 304, such as a red-green-blue (RGB) LED, undergoes total internal reflection. The planar waveguide 302 is coupled to a holographic out-coupler 306 and when light rays are incident upon the holographic out-coupler 306, the light rays are diffracted out of the planar waveguide 302 instead of being totally internal reflected. In another embodiment, the transparent backlight 134 of FIG. 3B includes a clear substrate 308 (e.g., plexiglass or acrylic material) upon which a sparse array of LED emitters 310 is patterned. Similarly, in the embodiment of FIG. 3C, the transparent backlight 134 includes a clear substrate 308 (e.g., plexiglass or acrylic material) upon which LEDs 312 are patterned. In this example, rather than having a sparse array that covers the entire substrate 308, a pair of broad LEDs 312 provide light to the entire SLM of the transmissive display panel (not shown) from outside the user's field of view. The embodiment of FIG. 3D is similar to that of FIG. 3A, in which the transparent backlight 134 includes a planar waveguide 302 within which light from a light source 304, such as a red-green-blue (RGB) LED, undergoes total internal reflection. However, instead of the planar waveguide 302 being coupled to a holographic out-coupler 306, the planar waveguide 302 includes a plurality of engineered surface defects 314 (e.g., illustrated as surface bumps in FIG. 3D but divots are also operable). When light rays are incident upon the plurality of engineered surface defects 314, the light rays are diffracted out of the planar waveguide 302 instead of being totally internal reflected. Thus, the transparent backlight 134 provides for presentation of light for virtual imagery generation while remaining transparent to the user.

Figure 4A:
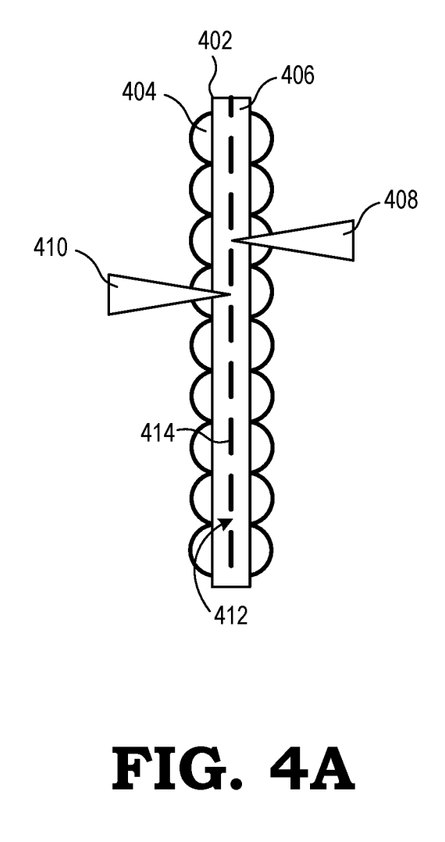
FIGS. 4A-4B illustrate cross-section views of example transmissive displays in the near-eye display system of FIG. 1 in in accordance with some embodiments.

FIGS. 4A-4B illustrate cross-section views of example transmissive displays in the near-eye display system of FIG. 1 in in accordance with some embodiments. The transmissive display panel 402 of FIG. 4A includes an array of micro-lenslets 404 patterned on one or more surfaces of the transparent SLM 406 (e.g., SLM 136 of FIGS. 1-2). As illustrated, the micro-lenslets 404 are positioned such that the micro-lenslets 404 are configured to focus light passing through the SLM, such as light 408 emitted by the transparent backlight 134 towards the beam splitters 126 or light 410 reflected from the beam splitters 126 towards the user's eye 132. It should be recognized that less than the entirety of the surface area of each aperture 412 formed by the SLM 406 and grating 414 pair is active due to the presence of, for example, back-plane electronics (not shown) which limit the fill-factor of the transmissive display panel 402. However, patterning the pixel-scale micro-lenslets 404 such that light hitting the SLM 406 gets focused through the apertures 412 improves the effective fill-factor.

Figure 4B:
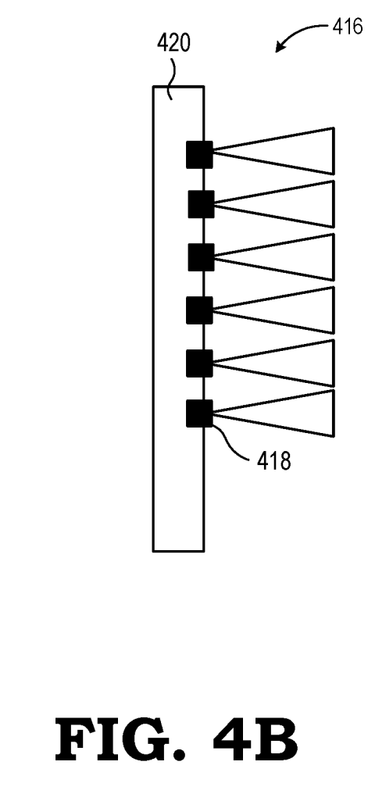

In other embodiments, rather than including the two discrete optical elements of the transparent backlight 134 and the transmissive display panel 136, the display panel 118 includes a singular optical element. For example, FIG. 4B illustrates a transparent organic light-emitting diode (OLED) display panel 416 which includes an array of OLED's 418 patterned on the surface of a transparent substrate 420 such that the pixels are actually emissive.

Figure 5:
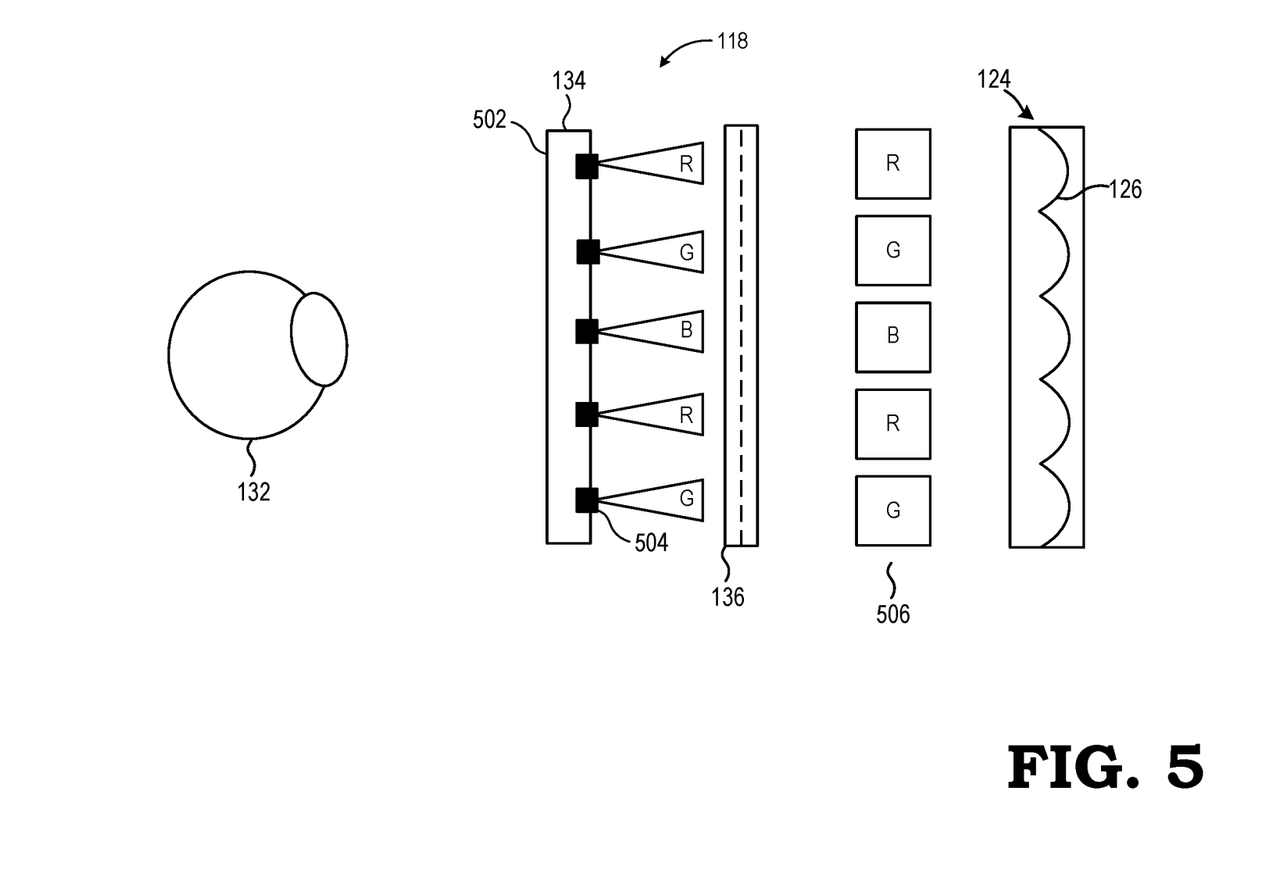
FIG. 5 is a diagram of light field encoding with transmissive displays in accordance with some embodiments.

FIG. 5 is a diagram of light field encoding with transmissive displays in accordance with some embodiments. In the example of FIG. 5, the transparent backlight 134 includes a clear substrate 502 (e.g., plexiglass or acrylic material) upon which a sparse array of LED emitters 504 is patterned. Each of the LED emitters are spaced at about the pitch of the curved beam splitters 126. Thus, as shown in this view, each of the curved beam splitters 126 of the beam splitter array serves as a separate "projector" onto the eye, with each "projector" overlapping with one or more adjacent projectors in forming a composite virtual image (due to elemental images overlapping as they pass through the lens of the eye 132) from the array of elemental images 506 displayed by the display panel 118 (e.g., transparent backlight 134 and the transmissive display panel 136).

As shown, each of the LED emitters 504 is a RGB LED of a specific color. The resulting color field elemental images 506 also are each of one of the RGB colors due to the above-discussed configuration of one LED emitter 504 per curved beam splitter 126, such that a light field frame is encoded using contiguous color field elemental images. The RGB color field elemental images 506 enables spatial multiplexing of color (instead of temporal multiplexing, which saves frame rate. The light field frame already contains redundant pixels, so the RGB component breakup allows use of adjacent elemental images to provide different color information without visibly decreasing resolution.

The RGB lightfield encoding is also more photon efficient, as each RBG LED emitter 504 is fully emissive and does not include, for example, absorptive Bayer filters that performs sub-pixel divisions to filter light by wavelength range. When passing light using absorptive filters, approximately two-thirds of light intensity is filtered out to pass one of the three colors. Thus, light field encoding using color field elemental images is more computationally efficient than filter-based systems, as the information throughput loss is decreased relative to systems that use absorptive filters.

Figure 6:
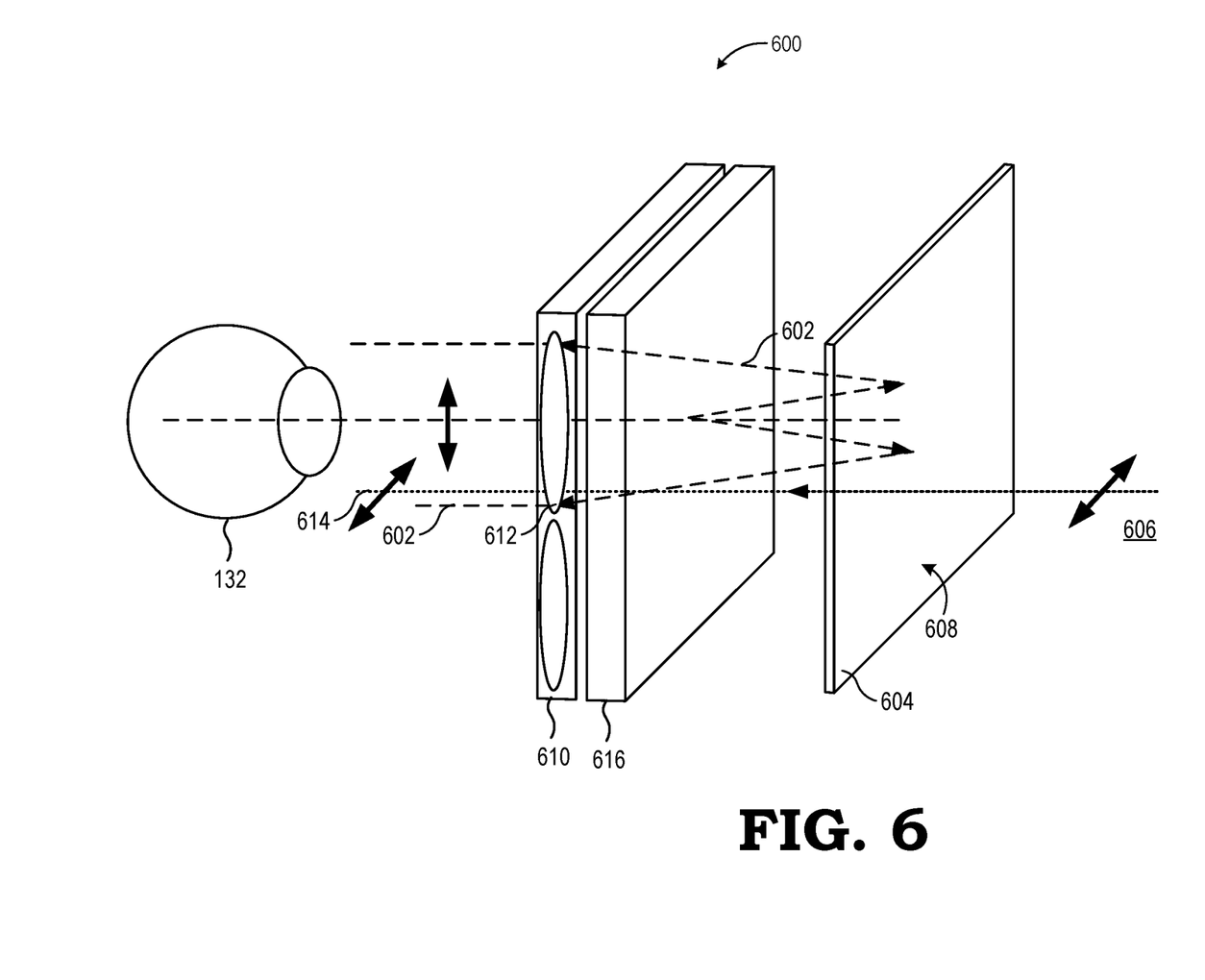
FIG. 6 is a diagram of an example birefringent lens array for light field display such as the ones utilized in the near-eye display system of FIG. 1 in accordance with some embodiments.

FIG. 6 is a diagram of a perspective view 600 of an example birefringent lens array for light field display such as the ones utilized in the near-eye display system 100 in accordance with some embodiments. As shown in this view, light rays 602 emitted from the transparent OLED display panel 616 (e.g., transparent OLED display panel 416 of FIG. 4) reflects off a wire grid polarizer 604. The wire grid polarizer 604 includes many parallel metallic wires (not shown) that are placed in a plane. The wire grid polarizer 604 mostly reflects non-transmitted polarization and is used as a polarizing beam splitter.

For example, in one embodiment, the light rays 602 emitted from the transparent OLED display panel 616 is polarized in the vertical direction (i.e., polarized in the S-wave direction). Electromagnetic waves which have a component of their electric fields aligned parallel to the metallic wires will induce the movement of electrons along the length of the wires. Since the electrons are free to move in this direction, the polarizer behaves in a similar manner to the surface of a metal when reflecting light, and the wave is reflected. However, for electromagnetic waves with electric fields perpendicular to the metallic wires, the electrons cannot move very far across the width of each wire. Therefore, little energy is reflected and the incident wave is passes through without reflection. The wire grid polarizer 604 therefore operates like a mirror for vertical polarization and passes horizontally polarized light. In another embodiment, the light rays 602 emitted from the transparent OLED display panel 616 is polarized in the horizontal direction (i.e., polarized in the P-wave direction). The wire grid polarizer 604 in that embodiment therefore has its metallic wires rotated ninety degrees such that the wire grid polarizer 604 operates like a mirror for horizontal polarization and passes vertically polarized light.

Light in the real world 606 (e.g., a real world environment in which the user is situated) is generally unpolarized, and has equal components of the S-wave and P-wave states. Thus, light in the real world 606 that is in the P-wave state (i.e., horizontally polarized) passes through the wire grid polarizer 604. Light in the real world 606 that is in the S-wave state (i.e., vertically polarized) reflects off the real world facing surface 608 of the wire grid polarizer 604 back to the surrounding real world environment. However, this results in loss of half the amount of world light that is passed through to the eye 132 of the user.

The near-eye display system also includes a birefringent lens array 610 positioned between the user's eye 132 and the transparent OLED display panel 616. In some embodiments, the birefringent lens array 610 includes birefringent lenses 612 having liquid crystal molecules oriented such as to form a birefringent material having a refractive index that depends on the polarization and propagation direction of light. Although described here specifically in the context of liquid crystal birefringent lenses, any birefringent material may be used without departing from the scope of this disclosure. For example, in other embodiments, the birefringent lens array 610 includes birefringent lenses 612 including nanophotonic or metamaterials engineered to exhibit birefringence.

The birefringent lenses 612 operate as collimating lenses for one polarization state and passes light straight through without bending for another polarization state. In particular, as shown in FIG. 6, the birefringent lenses 612 pass the horizontally polarized world light 614 (i.e., P-wave state). Thus, the horizontally polarized world light 614 passes through all of the wire grid polarizer 604, the transparent OLED display panel 616, and the birefringent lens array 610 without interference, thereby enabling the eye 132 to perceive the real world 606 without optical interference. In contrast, as shown in FIG. 6, the birefringent lenses 612 collimate the vertically polarized light 602 (i.e., S-wave state). Thus, the vertically polarized light 602, after being emitted from the OLED display panel 616 and reflected by the wire grid polarizer 604, is collimated and presented to the eye 132 as virtual imagery overlaid real world imagery.

It should be recognized that systems described herein include embodiments (e.g., as described relative to FIGS. 2 and 6 in more detail) in which the light being encoded passes through the SLM twice. For example, when tracing the path of light photons emitted by one pixel in FIG. 2, the light rays 204 from that pixel travel in a cone of light. The light rays 204 hit the curved beam splitter 126 and are subsequently reflected back towards the eye 132 approximately collimated. Accordingly, the light (which contains image data) for that one pixel becomes multiplexed with the light of its neighboring pixels in Fourier space, which can cause reconstruction artifacts referred to herein as "double-pass reconstruction artifacts."

In some embodiments, the perceptibility of double-pass reconstruction artifacts is reduced by reducing the contrast of a source image being encoded in its central region. For example, the contrast is reduced in the central portion of each of the color field elemental images while tapering the amount of contrast reduction to the original source image contrast at the edges of each elemental image. By reducing the contrast of the central group of pixels in each elemental image, the perceptibility of double-pass reconstruction artifacts in the resulting light field frame is reduced.

Figure 7:
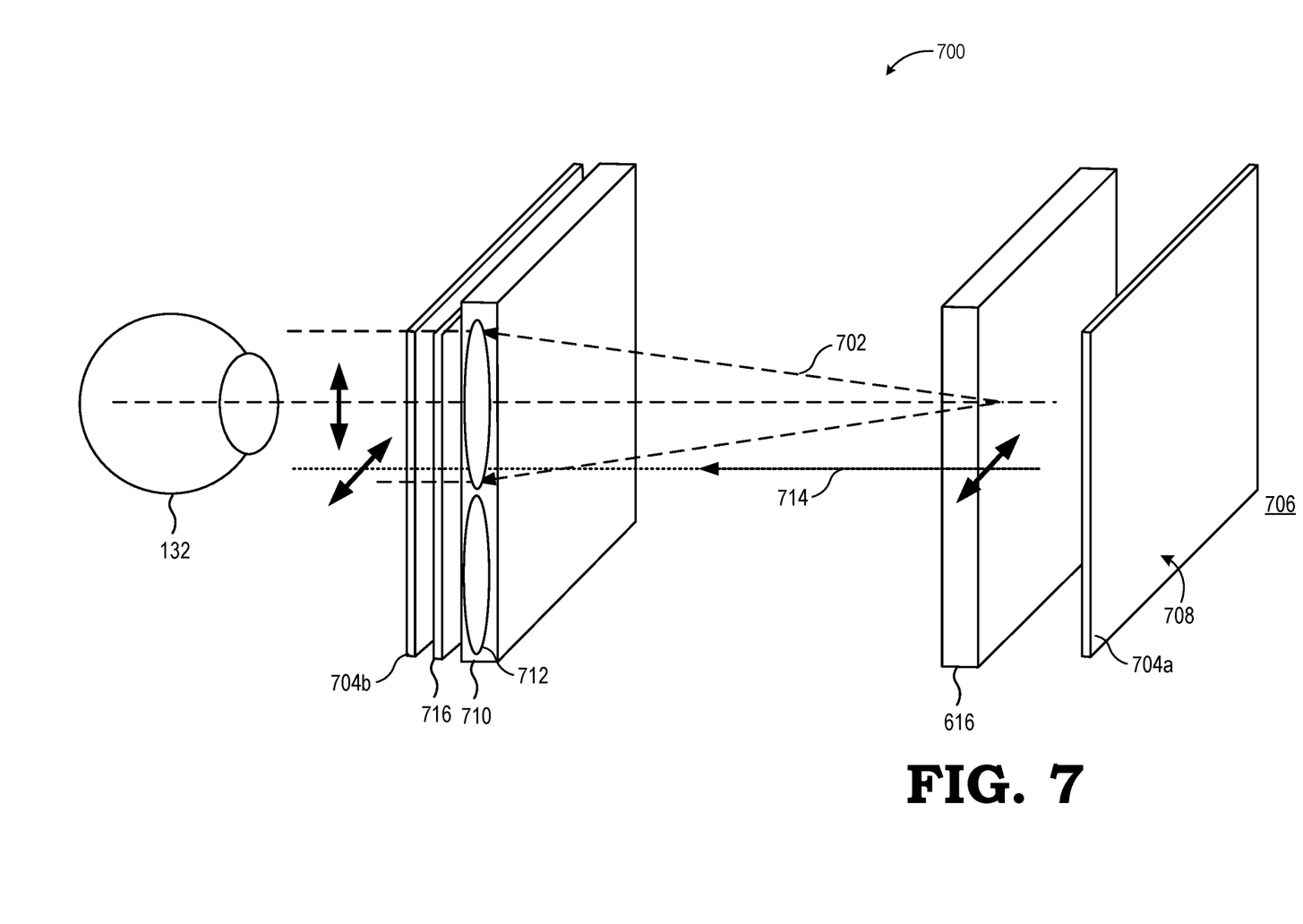
FIG. 7 is a diagram of an example variable polarization rotator for light field display such as the ones utilized in the near-eye display system of FIG. 1 in accordance with some embodiments.

In a different embodiment, to avoid the double path of the light rays 602 of FIG. 6 (i.e., both leaving and entering the OLED display panel 616), FIG. 7 illustrates a diagram of a perspective view 700 of an example variable polarization rotator for light field display such as the ones utilized in the near-eye display system 100 in accordance with some embodiments. The embodiment in FIG. 6 of positions the OLED display panel 616 at a distance of half focal length away from the birefringent lens array 610 and reflecting light rays 602 off the wire grid polarizer 604, which may result in double-path artifact issues. In contrast, the embodiment in FIG. 7 positions the OLED display panel 616 at a distance of half focal length away from the birefringent lens array 610.

As shown in FIG. 7, the near-eye display system includes a first wire grid polarizer 704a similar to that of wire grid polarizer 604 in FIG. 6. The first wire grid polarizer 704a filters light in the real world 706 such that horizontally polarized light (i.e., P-wave state) passes through the first wire grid polarizer 704a while vertically polarized light (i.e., S-wave state) reflects off the real world facing surface 708 of the first wire grid polarizer 704a back to the surrounding real world environment. The horizontally polarized world light 714 (i.e., P-wave state) passes through the birefringent lenses 712 of birefringent lens array 710 without optical interference. Subsequently, the horizontally polarized world light 714 passes through a second wire grid polarizer 704b and reaches the eye 132 unaffected.

However, the light rays 702 emitted from the OLED display panel 616 is unpolarized light and has components of both the S-wave and P-wave states. Half of the unpolarized light rays 702 gets refracted by the birefringent lens array 710 (i.e., the vertically polarized S-wave state light) and half of the unpolarized light rays 702 (i.e., the horizontally polarized P-wave state light) passes through similar to that of the horizontally polarized world light 714. The horizontally polarized P-wave state light rays represents out-of-focus light for virtual imagery, which is blocked by a variable half wave plate 716. The variable half wave plate 716 operates as a polarization rotator such that the polarization of the unpolarized light rays 702 is rotated. In this manner, the previously vertically polarized S-wave state light containing desired virtual imagery data gets rotated to the P-wave state so that it can pass through the second wire grid polarizer 704b and reach the eye 132 to be perceived as virtual imagery overlaid real world imagery. In contrast, the previously horizontally polarized P-wave state light representing out-of-focus light gets rotated to the S-wave state so that it is blocked from reaching the eye 132. Accordingly, the variable half wave plate 716 is actively controlled to dedicate a portion (e.g., approximately half) of its operating time to passing real world 706 imagery and another portion (e.g., approximately half again) of its operating time to modulating and passing virtual world imagery.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A rendering system comprising:
   at least one processor; and
   a storage component to store a set of executable instructions, the set of executable instructions configured to manipulate the at least one processor to render an integral light field frame comprising an array of elemental images, the set of executable instructions further configured to manipulate the at least one processor to encode the integral light field frame based on a spatial multiplexing of color field elemental images.

2. The rendering system of claim 1, wherein the set of executable instructions are configured to manipulate the at least one processor to adjust the integral light field frame by:
   reducing contrast of a central portion of each of the color field elemental images to reduce perceptibility of double-pass reconstruction artifacts.

3. A method comprising:
   rendering, by at least one processor, an integral light field frame comprising an array of elemental images; and
   encoding, by the at least one processor, the integral light field frame based on a spatial multiplexing of color field elemental images.

4. The method of claim 3, wherein adjusting the integral light field frame comprises reducing contrast of a central portion of each of the color field elemental images to reduce perceptibility of double-pass reconstruction artifacts.

5. The method of claim 3, further comprising sending, by the at least one processor, the encoded integral light field frame to a transmissive display panel, wherein the transmissive display panel is transparent to light.

6. The method of claim 5, further comprising instructing, by the at least one processor, the transmissive display panel to transmit light rays of the integral light field frame away from a user's eye and towards an array of beam splitters.

7. The method of claim 3, further comprising tracking, by the at least one processor, a pose of a user's eye, wherein the array of elemental images is rendered based on pose information determined based on tracking the pose of the user's eye.

8. The method of claim 3, further comprising instructing, by the at least one processor, a half-wave plate to rotate between a first polarization state where out-of-focus imagery data is blocked by a grid polarizer from reaching a user's eye and a second polarization state where virtual imagery data is passable through wire grid polarizer.

9. A near-eye display system, comprising:
   at least one processor to render an integral light field frame comprising an array of elemental images and to encode the integral light field frame based on a spatial multiplexing of color field elemental images; and
   a transmissive display panel to display the integral light field frame, wherein the transmissive display panel is transparent to light.

10. The near-eye display system of claim 9, further comprising a birefringent lens array to collimate light rays of the integral light field frame for presentation to a user's eye.

11. The near-eye display system of claim 10, wherein the transmissive display panel is configured to transmit light rays of the integral light field frame away from a user's eye and towards a wire grid polarizer, and further wherein the wire grid polarizer is configured to reflect light rays of a first polarization state back towards the transmissive display panel.

12. The near-eye display system of claim 11, wherein the transmissive display panel is configured to pass the reflected light rays of the first polarization state for transmission to the birefringent lens array for collimation prior to presentation to the user's eye.

13. The near-eye display system of claim 12, wherein the wire grid polarizer is configured to transmit light rays originating from a real world environment of a second polarization state to the transmissive display panel.

14. The near-eye display system of claim 13, wherein the transmissive display panel is configured to pass the light rays of the second polarization state for transmission to the birefringent lens array, and further wherein both the birefringent lens array and the wire grid polarizer pass the light rays of the second polarization state for presentation to the user's eye without changing a travel path of the light rays of the second polarization state.

15. The near-eye display system of claim 14, wherein the transmissive display panel is configured to transmit light rays of the integral light field frame towards the user's eye and towards the birefringent lens array for collimation prior to presentation to the user's eye.

16. The near-eye display system of claim 15, wherein a first portion of the light rays transmitted by the transmissive display panel comprises light rays of the first polarization state representing desired virtual imagery data that are refracted by the birefringent lens array, and further wherein a second portion of the light rays transmitted by the transmissive display panel comprises light rays of a second polarization state representing out-of-focus imagery data that pass through the birefringent lens array without changing travel path.

17. The near-eye display system of claim 16, further comprising:
 a second wire grid polarizer positioned proximal to the user's eye; and
 a variable half wave plate positioned between the second wire grid polarizer and the birefringent lens array, wherein the variable half wave plate is configured to rotate a polarization state of light rays received from the birefringent lens array.

18. The near-eye display system of claim 17, wherein the variable half wave plate rotates the first portion of the light rays of the first polarization state to the second polarization state such that desired virtual imagery data is passable through the second wire grid polarizer for presentation to the user's eye.

19. The near-eye display system of claim 17, wherein the variable half wave plate rotates the second portion of the light rays of the second polarization state to the first polarization state such that out-of-focus imagery data is blocked by the second wire grid polarizer from reaching the user's eye.

20. The near-eye display system of claim 9, further comprising a beam splitter array to collimate light rays of the integral light field frame for presentation to a user's eye.

\* \* \* \* \*